(12) United States Patent
Jia et al.

(10) Patent No.: US 11,051,221 B2
(45) Date of Patent: Jun. 29, 2021

(54) NETWORK ACCESS METHOD AND DEVICE

(71) Applicant: HUAWEI TECHNOLOGIES CO., LTD., Shenzhen (CN)

(72) Inventors: Xiaoqian Jia, Shanghai (CN); Haiyan Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/403,437

(22) Filed: May 3, 2019

(65) Prior Publication Data

US 2019/0261241 A1    Aug. 22, 2019

Related U.S. Application Data

(63) Continuation of application No. PCT/CN2017/107487, filed on Oct. 24, 2017.

(30) Foreign Application Priority Data

Nov. 3, 2016    (CN) .......................... 201610954139.9

(51) Int. Cl.
*H04W 36/08* (2009.01)
*H04W 36/00* (2009.01)
(Continued)

(52) U.S. Cl.
CPC .......... *H04W 36/08* (2013.01); *H04B 7/0617* (2013.01); *H04B 7/088* (2013.01);
(Continued)

(58) Field of Classification Search
CPC . H04W 36/08; H04W 36/0058; H04W 16/28; H04W 36/00; H04W 36/0072;
(Continued)

(56) References Cited

U.S. PATENT DOCUMENTS 10,334,542 B2 * 6/2019 Lu .................... H04W 72/0446
10,367,677 B2 * 7/2019 Parkvall ............. H04L 41/0816
(Continued)

FOREIGN PATENT DOCUMENTS

CN    103517351 A    1/2014
CN    104956606 A    9/2015
(Continued)

OTHER PUBLICATIONS

Huawei et al: "RACH resources for handover", 3GPP Draft;R2-1704842, vol. RAN WG2, No. Hangzhou, China; May 15, 2017-May 19, 2017, May 6, 2017, XP051264584, 2 pages.

*Primary Examiner* — Phirin Sam
*Assistant Examiner* — Louis Samara
(74) *Attorney, Agent, or Firm* — Hauptman Ham, LLP (57) ABSTRACT

Embodiments provide a network access method and a device. In accordance with the method, a preamble sequence may be received by a second network device from a terminal device on a time-frequency resource occupied by the preamble sequence. A transmit beam may be determined for sending an access response message to the terminal device. The access response message can be sent to the terminal device using the transmit beam. The second access device can send the access response message to the terminal device through beamforming, so that a coverage area of the second access device can be enlarged, directivity of data sent to the terminal device can be improved, and a probability that the terminal device receives the access response message is improved. Therefore, a rate that the terminal device succeeds in accessing the second access device is improved.

16 Claims, 4 Drawing Sheets

(51) Int. Cl.
    *H04B 7/06* (2006.01)
    *H04W 74/08* (2009.01)
    *H04W 36/14* (2009.01)
    *H04W 16/28* (2009.01)
    *H04B 7/08* (2006.01)
    *H04W 36/04* (2009.01)

(52) U.S. Cl.
    CPC .......... *H04W 16/28* (2013.01); *H04W 36/00* (2013.01); *H04W 36/0058* (2018.08); *H04W 36/0072* (2013.01); *H04W 36/0077* (2013.01); *H04W 36/14* (2013.01); *H04W 74/0833* (2013.01); *H04B 7/0695* (2013.01); *H04W 36/04* (2013.01)

(58) Field of Classification Search
    CPC ............ H04W 36/0077; H04W 36/14; H04W 74/0833; H04W 36/04; H04B 7/0617; H04B 7/088; H04B 7/0695
    See application file for complete search history.

(56) References Cited

U.S. PATENT DOCUMENTS

| | | |
|---|---|---|
| 2012/0243638 A1* | 9/2012 | Maltsev ............ H04W 52/0235 |
| | | 375/316 |
| 2014/0376466 A1 | 12/2014 | Jeong et al. |
| 2016/0029358 A1 | 1/2016 | Hou |
| 2016/0295613 A1 | 10/2016 | Wager et al. |
| 2017/0359734 A1 | 12/2017 | Lee et al. |
| 2019/0104549 A1 | 4/2019 | Deng et al. |

FOREIGN PATENT DOCUMENTS

| | | | | |
|---|---|---|---|---|
| CN | 105379357 A | 3/2016 | | |
| CN | 105453687 A | 3/2016 | | |
| EP | 2887561 A1 | 6/2015 | | |
| KR | 20090111434 A | 10/2009 | | |
| WO | 2012082053 A1 | 6/2012 | | |
| WO | WO-2014000498 A1 * | 1/2014 | ............ | H04W 76/10 |
| WO | 2016086144 A1 | 6/2016 | | |
| WO | WO-2016086144 A1 * | 6/2016 | ........... | H04B 7/0617 |
| WO | WO-2017092021 A1 * | 6/2017 | ........ | H04W 36/0005 |

* cited by examiner

NETWORK ACCESS METHOD AND DEVICE

CROSS-REFERENCE TO RELATED APPLICATIONS

This application is a continuation of International Application No. PCT/CN2017/107487, filed on Oct. 24, 2017, which claims priority to Chinese Patent Application No. 201610954139.9, filed on Nov. 3, 2016. The disclosures of the aforementioned applications are hereby incorporated by reference in their entireties.

TECHNICAL FIELD

This application relates to the communications technologies, and in particular, to a network access method and a device.

BACKGROUND

Existing commercial wireless communications systems, such as 2G, 3G, and 4G communications systems, usually operate on a frequency band lower than 3 GHz. Spectrum resources are scarce and precious; therefore, using a high frequency band (for example, a carrier frequency higher than 6 GHz) in a new system in the future is proposed in the industry. The high frequency band has a relatively wide bandwidth, and therefore is suitable for transmitting high-speed data. However, a high-frequency signal has a relatively weak penetration capability and does not have a strong diffraction capability. As a result, a coverage area of a high-frequency network in which a high frequency band is used is relatively small.

In the prior art, a coverage area of a network can be enlarged through beamforming. However, a terminal device can transmit data through beamforming only after accessing the network. A cell edge terminal device in coverage of a high-frequency network has inferior signal quality and a high access failure rate; therefore, a plurality of attempts probably need to be made before the cell edge terminal device can access the high-frequency network.

SUMMARY

This application provides a network access method and a device, so that a rate that a terminal device succeeds in accessing a network can be improved.

A first aspect of this application provides a network access method, including: receiving, by a second access device, a preamble sequence from a terminal device on a time-frequency resource occupied by the preamble sequence; determining, based on the received preamble sequence, a transmit beam that is used for sending an access response message to the terminal device; and sending, by the second access device, the access response message to the terminal device by using the transmit beam. The second access device sends the access response message to the terminal device through beamforming in a process in which the terminal device accesses a network, so that channel interference can be reduced and a cell coverage area can be enlarged. Therefore, a rate that the terminal device succeeds in accessing the network is improved.

Optionally, the determining, by the second access device based on the received preamble sequence, a transmit beam that is used for sending an access response message to the terminal device is specifically: receiving, by the second access device, the preamble sequence on receive beams; determining channel quality information of each receive beam based on the preamble sequence that is received on the receive beam; selecting, based on channel quality information of the receive beams, a receive beam that has best channel quality as a target receive beam; determining weights of antenna ports based on the preamble sequence that is received by the antenna ports on the target receive beam; and generating the transmit beam based on the weights of the antenna ports. The second access device receives the preamble sequence through beamforming, so that a coverage area of the second access device is enlarged and a probability that the preamble sequence is received improved.

Optionally, the method further includes: allocating, by the second access device to the terminal device, the preamble sequence that is used for accessing the second access and the time-frequency resource occupied by the preamble sequence; and sending access information to the terminal device by using a first access device, where the access information includes information about the preamble sequence used by the terminal device to access the second access device and information about the time-frequency resource occupied by the preamble sequence.

A second aspect of this application provides a network access method, including: receiving, by a terminal device, access information that is from a first access device and that is used by the terminal device to access a second access device, where the access information includes information about a preamble sequence used by the terminal device to access the second access device and information about a time-frequency resource occupied by the preamble sequence; sending, by the terminal device, the preamble sequence to the second access device on the time-frequency resource occupied by the preamble sequence; and receiving an access response message sent by the second access device. The first access device assists the terminal device in obtaining the access information that is used for accessing the second access device, so that reliability of transmitting and/or receiving the access information is improved.

Optionally, the preamble sequence is used to determine a transmit beam that is used for sending the access response message to the terminal device, and the second access device sends the access response message to the terminal device by using the transmit beam. The access response message is sent to the terminal device through beamforming, so that channel interference can be reduced and a cell coverage area can be enlarged. Therefore, a rate that the terminal device succeeds in accessing a network is improved.

A third aspect of this application provides a network access method, including: obtaining, by a first access device, access information that is used by a terminal device to access a second access device, where the access information includes information about a preamble sequence used by the terminal device to access the second access device and information about a time-frequency resource occupied by the preamble sequence; and sending the access information to the terminal device. The first access device assists the terminal device in obtaining the access information that is used for accessing the second access device, so that reliability of transmitting the access information is improved.

Optionally, the method further includes: determining, by the first access device based on a service requirement of the terminal device, or a neighboring cell measurement result reported by the terminal device, or load information of the first access device and/or the second access device, that the terminal device is to access the second access device.

A fourth aspect of this application provides a second access device, including a receiving module, a processing module, and a sending module. The receiving module is configured to receive a preamble sequence from a terminal device on a time-frequency resource occupied by the preamble sequence; the processing module is configured to determine, based on the preamble sequence received by the receiving module, a transmit beam that is used for sending an access response message to the terminal device; and the sending module is configured to send the access response message to the terminal device by using the transmit beam.

Optionally, the processing module is specifically configured to: receive the preamble sequence on receive beams; determine channel quality information of each receive beam based on the preamble sequence that is received on the receive beam; select, based on channel quality information of the receive beams, a receive beam that has best channel quality as a target receive beam; determine weights of antenna ports based on the preamble sequence that is received by the antenna ports on the target receive beam; and generate the transmit beam based on the weights of the antenna ports.

Optionally, the processing module is further configured to allocate, to the terminal device, the preamble sequence that is used for accessing the second access device and the time-frequency resource occupied by the preamble sequence; and the sending module is further configured to send access information to the terminal device by using a first access device, where the access information includes information about the preamble sequence used by the terminal device to access the second access and information about the time-frequency resource occupied by the preamble sequence.

For beneficial effects of the second access device provided in the fourth aspect and the possible implementations of the fourth aspect, refer to beneficial effects brought by the first aspect and the possible implementations of the first aspect. Details are not described herein again.

A fifth aspect of this application provides a terminal device, including a receiving module and a sending module. The receiving module is configured to receive access information that is from a first access device and that is used by the terminal device to access a second access device, where the access information includes information about a preamble sequence used by the terminal device to access the second access device and information about a time-frequency resource occupied by the preamble sequence; the sending module is configured to send the preamble sequence to the second access device on the time-frequency resource occupied by the preamble sequence; and the receiving module is further configured to receive an access response message that is sent by the second access device on a transmit beam.

Optionally, the preamble sequence is used to determine the transmit beam that is used for sending the access response message to the terminal device, and the second access device sends the access response message to the terminal device by using the transmit beam.

For beneficial effects of the terminal device provided in the fifth aspect and the possible implementation of the fifth aspect, refer to beneficial effects brought by the second aspect and the possible implementation of the second aspect. Details are not described herein again.

A sixth aspect of this application provides a first access device, including a processing module and a sending module. The processing module is configured to obtain access information that is used by a terminal device to access a second access device, where the access information includes information about a preamble sequence used by the terminal device to access the second access device and information about a time-frequency resource occupied by the preamble sequence; and the sending module is configured to send the access information to the terminal device.

Optionally, the processing module is further configured to determine, based on a service requirement of the terminal device, or a neighboring cell measurement result reported by the terminal device, or load information of the first access device and/or the second access device, that the terminal device is to access the second access device.

For beneficial effects of the first access device provided in the sixth aspect and the possible implementation of the sixth aspect, refer to beneficial effects brought by the third aspect and the possible implementation of the third aspect. Details are not described herein again.

A seventh aspect of this application provides a second access device, including a transceiver, a processor, and a memory. The memory is configured to store an instruction; the transceiver is configured to communicate with another network device; and the processor is configured to execute the instruction stored in the memory, so that the second access device performs the following method:

receiving a preamble sequence from a terminal device on a time-frequency resource occupied by the preamble sequence; determining, based on the received preamble sequence, a transmit beam that is used for sending an access response message to the terminal device; and sending the access response message to the terminal device by using the transmit beam.

Optionally, that the processor determines, based on the received preamble sequence, a transmit beam that is used for sending an access response message to the terminal device is specifically: receiving the preamble sequence on receive beams; determining channel quality information of each receive beam based on the preamble sequence that is received on the receive beam; selecting, based on channel quality information of the receive beams, a receive beam that has best channel quality as a target receive beam; determining weights of antenna ports based on the preamble sequence that is received by the antenna ports on the target receive beam; and generating the transmit beam based on the weights of the antenna ports.

Optionally, the processor is further configured to: allocate, to the terminal device, the preamble sequence that is used for accessing the second access device and the time-frequency resource occupied by the preamble sequence; and send access information to the terminal device by using a first access device, where the access information includes information about the preamble sequence used by the terminal device to access the second access and information about the time-frequency resource occupied by the preamble sequence.

For beneficial effects of the second access device provided in the seventh aspect and the possible implementations of the seventh aspect, refer to beneficial effects brought by the first aspect and the possible implementations of the first aspect. Details are not described herein again.

An eighth aspect of this application provides a terminal device, including a transceiver, a processor, and a memory. The memory is configured to store an instruction; the transceiver is configured to communicate with another network device; and the processor is configured to execute the instruction stored in the memory, so that the terminal device performs the following method:

receiving access information that is from a first access device and that is used by the terminal device to access a second access device, where the access information includes information about a preamble sequence used by the terminal device to access the second access device and information about a time-frequency resource occupied by the preamble sequence; sending the preamble sequence to the second access device on the time-frequency resource occupied by the preamble sequence; and receiving an access response message sent by the second access device.

Optionally, the preamble sequence is used to determine a transmit beam that is used for sending the access response message to the terminal device, and the second access device sends the access response message to the terminal device by using the transmit beam.

For beneficial effects of the terminal device provided in the eighth aspect and the possible implementation of the eighth aspect, refer to beneficial effects brought by the second aspect and the possible implementation of the second aspect. Details are not described herein again.

A ninth aspect of this application provides a first access device, including a transceiver, a processor, and a memory. The memory is configured to store an instruction; the transceiver is configured to communicate with another network device; and the processor is configured to execute the instruction stored in the memory, so that the first access device performs the following method:

obtaining access information that is used by a terminal device to access a second access device, where the access information includes information about a preamble sequence used by the terminal device to access the second access device and information about a time-frequency resource occupied by the preamble sequence; and sending the access information to the terminal device.

Optionally, the processor is further configured to determine, based on a service requirement of the terminal device, or a neighboring cell measurement result reported by the terminal device, or load information of the first access device and/or the second access device, that the terminal device is to access the second access device.

For beneficial effects of the first access device provided in the ninth aspect and the possible implementation of the ninth aspect, refer to beneficial effects brought by the third aspect and the possible implementation of the third aspect. Details are not described herein again.

Optionally, in the first aspect to the ninth aspect of this application, the access information is carried in a radio resource control (RRC) connection reconfiguration message or an RRC connection setup complete message.

Optionally, in the first aspect to the ninth aspect of this application, the time-frequency resource occupied by the preamble sequence is a dedicated time-frequency resource of the terminal device; or the time-frequency resource occupied by the preamble sequence is a shared time-frequency resource.

Optionally, in the first aspect to the ninth aspect of this application, the second access device uses a high-frequency resource for communication, the first access device uses a low-frequency resource for communication, and the time-frequency resource occupied by the preamble sequence is a high-frequency resource.

Optionally, in the first aspect to the ninth aspect of this application, the terminal device is a cell edge terminal device in a coverage area of the second access device.

DESCRIPTION OF EMBODIMENTS

Figure 1:
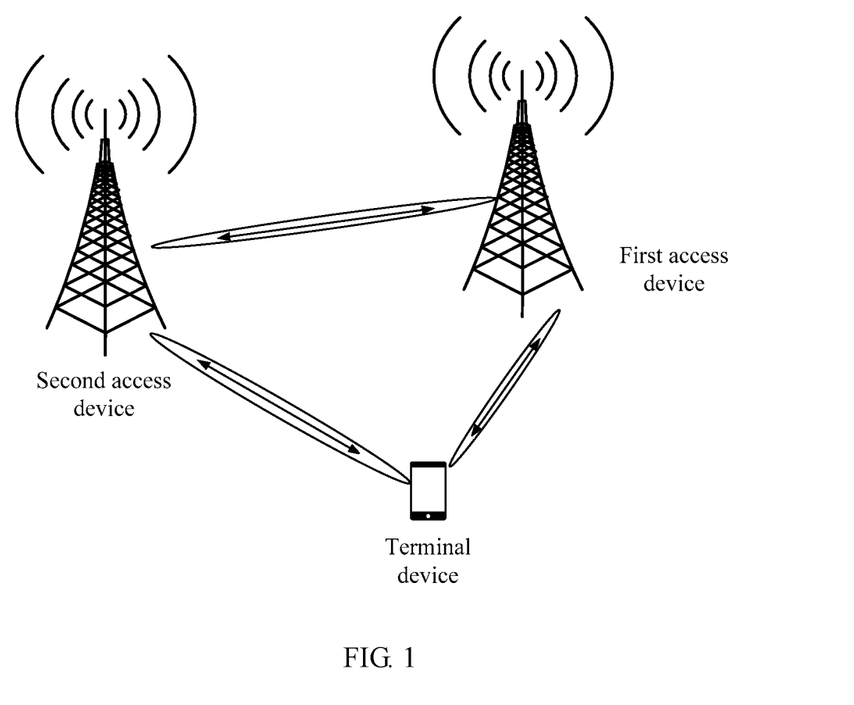
FIG. 1 is a schematic diagram of an architecture of a network system to which this application is applicable.

FIG. 1 is a schematic diagram of an architecture of a network system to which this application is applicable. As shown in FIG. 1, the network system includes a first access device, a second access device, and a terminal device. Communications frequency bands used by the first access device and the second access device may be the same or may be different. For example, the first access device uses a low frequency band for communication and the second access device uses a high frequency band for communication, or both the first access device and the second access device use a high frequency band or a low frequency band for communication. In this application, the low frequency band may be a frequency band whose frequency is less than 6 GHz, and the high frequency band may be a frequency band whose frequency is greater than 6 GHz. It should be noted that, in a scenario shown in FIG. 1, the first access device and second access device do not share a base station. The method of this application is also applicable to a scenario in which the first access device and the second access device share a base station.

Figure 2:
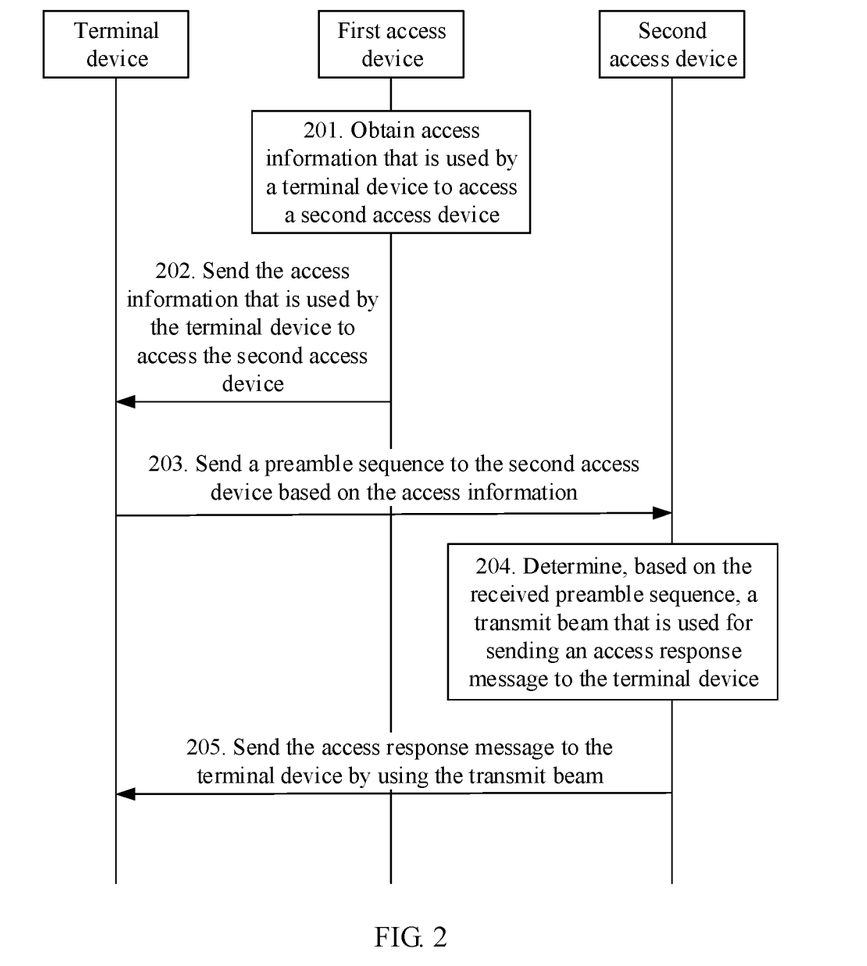
FIG. 2 is a schematic signaling flowchart of a network access method according to Embodiment 1 of this application.

FIG. 2 is a schematic signaling flowchart of a network access method according to Embodiment 1 of this invention. As shown in FIG. 2, the method provided in this embodiment may include the following steps.

Step 201. A first access device obtains access information that is used by a terminal device to access a second access device.

For example, the access information may include information about a preamble sequence used by the terminal device to access the second access device and information about a time-frequency resource occupied by the preamble sequence. For example, the information about the preamble sequence may be an index value of the preamble sequence, and the terminal device obtains the preamble sequence based on the index value of the preamble sequence. The information about the time-frequency resource occupied by the preamble sequence may be an index value of the time-frequency resource, and the terminal device obtains, based on the index value of the time-frequency resource, a time-frequency resource block occupied for sending the preamble sequence.

For example, the first access device may obtain the access information in the following manners:

(1) The access information is preconfigured in the first access device.

(2) The first access device obtains the access information from the second access device. For example, the first access device may request the access information from the second access device, and the second access device allocates, to the terminal device based on a request of the first access device, the preamble sequence used for accessing the second access device and the time-frequency resource occupied by the preamble sequence.

(3) The access information may be stored in a server, and the first access device requests for obtaining the access information from the server.

Optionally, before step 201, the terminal device accesses the first access device through a random access procedure, and sets up a radio resource control (RRC) connection to the first access device. It should be noted that a plurality of signaling interactions may be required in a process in which the terminal device accesses the first access device and sets up the RRC connection to the first access device. Details are not described herein.

Optionally, before the first access device obtains the access information that is used by the terminal device to access the second access device, the first access device or the terminal device determines the to-be-accessed second access device, and the first access device is triggered to obtain the access information that is used by the terminal device to access the second access device.

For example, the terminal device may determine the to-be-accessed second access device in the following manners:

(1) The terminal device performs neighboring cell measurement periodically, and determines the to-be-accessed second access device based on a neighboring cell measurement result. The neighboring cell measurement result may include information such as measured signal quality and/or a measured signal strength of a cell. In this way, the terminal device may determine the to-be-accessed second access device based on the signal quality and/or the signal strength.

(2) The terminal device may alternatively determine the to-be-accessed second access device based on a service requirement. For example, it is assumed that the second access device uses a high frequency band for communication and the first access device uses a low frequency band for communication. In high-frequency communication, a capacity is large and a transmission speed is fast; therefore, when a current service volume of the terminal device increases suddenly, the terminal device determines to access the second access device to meet a transmission requirement.

For example, the first access device may determine, in the following manners, that the terminal device is to access the second access device.

(1) The first access device may determine, based on the service requirement of the terminal device, that the terminal device is to access the second access device.

(2) The first access device receives the neighboring cell measurement result reported by the terminal device, and determines, based on the neighboring cell measurement result, that the terminal device is to access the second access device.

(3) The first access device obtains load information of the second access device, and determines, based on load information of the first access device and/or the load information of the second access device, that the terminal device is to access the second access device. For example, when a load of the first access device is greater than a first threshold, the first access device determines that the terminal device is to access the second access device. Alternatively, when a load of the second access device is less than a second threshold, the first access device determines that the terminal device is to access the second access device. Alternatively, when a load of the first access device is greater than a load of the second access device, the first access device determines that the terminal device is to access the second access device.

Step 202. The first access device sends, to the terminal device, the access information that is used by the terminal device to access the second access device.

For example, the first access device may add, to a newly defined message, the access information that is used by the terminal device to access the second access device, or may add, to an RRC connection setup complete message or an RRC connection reconfiguration message, the access information that is used by the terminal device to access the second access device, to send it to the terminal device.

Step 203. The terminal device sends a preamble sequence to the second access device based on the access information.

For example, the terminal device determines, based on the access information, the preamble sequence allocated to the terminal device and the time-frequency resource occupied for sending the preamble sequence, and then sends the preamble sequence to the second access device on the time-frequency resource occupied by the preamble sequence. Correspondingly, the second access device receives the preamble sequence on the time-frequency resource occupied by the preamble sequence.

Optionally, before the second access device receives the preamble sequence on the time-frequency resource occupied by the preamble sequence, the second access device obtains the access information that is used by the terminal device to access the second access device. Alternatively, the second access device allocates the access information to the terminal device. For example, the second access device may allocate the access information to the terminal device based on a request of the first access device. Alternatively, the second access device proactively allocates the access information to the terminal device, and sends the allocated access information to the first access device.

The second access device may obtain the access information in the following manners:

(1) The access information is preconfigured in the second access device.

(2) The access information may be prestored in a server, and the second access device requests the access information from the server.

Optionally, the time-frequency resource occupied by the preamble sequence in this embodiment may be a dedicated time-frequency resource of the terminal device, or may be a time-frequency resource shared by a plurality of terminal devices. The dedicated time-frequency resource can be used only by the terminal device, and cannot be used by another terminal device in a cell in which the second access device resides. The shared time-frequency resource may be used by all terminal devices in the cell in which the second access device resides.

Optionally, before the terminal device sends the preamble sequence to the second access device on the time-frequency resource occupied by the preamble sequence, the terminal device sets up downlink synchronization with the second access device. For example, a process in which the terminal device sets up downlink synchronization with the second access device may be as follows: The second access device broadcasts a primary synchronization signal (PSS) and a secondary synchronization signal (SSS), and the terminal device receives the PSS and the SSS that are broadcast by the second access device and sets up downlink synchronization with the second access device based on the PSS and the SSS. For example, the second access device may broadcast the PSS and the SSS through beamforming, or the second access device may broadcast the PSS and the SSS in a non-beamforming manner. The second access device sends the PSS and the SSS in a broadcasting manner and the second access device does not know a specific location of the terminal device; therefore, the second access device may successively send the PSS and the SSS on all beams based on a preset sending period and a preset sending order. The second access device broadcasts the PSS and the SSS through beamforming, so that a coverage area of the second access device can be enlarged and the PSS and the SSS are transmitted farther. Therefore, a cell edge terminal device or a terminal device with inferior signal quality can also receive the PSS and the SSS.

After setting up downlink synchronization with the second access device, the terminal device initiates a random access procedure based on the access information that is used by the terminal device to access the second access device. To be specific, the terminal device sends the preamble sequence to the second access device on the time-frequency resource occupied by the preamble sequence.

In this embodiment, the terminal device performs contention-free random access, and the preamble sequence and the time-frequency resource occupied by the preamble sequence are allocated by the second access device.

Step 204. The second access device determines, based on the received preamble sequence, a transmit beam that is used for sending an access response message to the terminal device.

In an implementation, the second access device receives the preamble sequence through beamforming. For example, the second access device receives the preamble sequence on receive beams; determines channel quality information of each receive beam based on the preamble sequence that is received on the receive beam; and selects, based on channel quality information of the receive beams, a receive beam that has best channel quality as a target receive beam. Then, the second access device determines weights of antenna ports based on the preamble sequence that is received by the antenna ports on the target receive beam. Finally, the second access device generates the transmit beam based on the weights of the antenna ports.

In this implementation, the second access device does not know the specific location of the terminal device; therefore, the second access device may successively receive the preamble sequence on all the beams based on a preset receiving period and a preset receiving order. The channel quality information of the receive beams may be a signal to interference plus noise ratio (SINR). Correspondingly, the receive beam that has best channel quality is a receive beam whose SINR is the greatest. The weight of the antenna port may include a feeding amplitude and a feeding phase of the antenna port.

A beamforming technology is applied to a multi-antenna array; therefore, the second access device has a plurality of antenna ports. The second access device determines the weights of the antenna ports based on the preamble sequence that is received by the antenna ports on the target receive beam. For example, the second access device computes, based on the preamble sequence that is received by the antenna ports, the weights of the antenna ports by using an Angle-of-Arrival (AOA) distance measuring algorithm or a direction of arrival (DOA) algorithm. In this embodiment, the weights of the antenna ports are parameters of an uplink channel. Because of symmetry of uplink and downlink channels, the second access device can directly compute the transmit beam based on the weights of the antenna ports.

In another implementation, the second access device receives the preamble sequence by using an omnidirectional antenna. For example, the second access device receives the preamble sequence in all directions of antenna ports, then determines weights of the antenna ports based on the preamble sequence that is received by the antenna ports, and finally generates the transmit beam based on the weights of the antenna ports. In this implementation, the method in which the second access device determines the weights of the antenna ports and generates the transmit beam is the same as the method used in the foregoing implementation. Details are not described herein again.

When the second access device uses a high frequency band for communication, the high frequency band has a relatively weak penetration capability and a small coverage area; therefore, the second access device may fail to receive the preamble sequence by using the omnidirectional antenna. Preferably, the preamble sequence is received through beamforming. In this way, the coverage area of the second access device can be enlarged, and a probability that the preamble sequence is received is improved.

It should be noted that the beam (including the transmit beam and the receive beam) mentioned in this embodiment and the following embodiments may be one or more of a time-frequency resource, an antenna port, and feeding information on the antenna port. For example, the beam may be further determined based on one unique index or identifier (ID), and the identifier or index is in a one-to-one correspondence with the beam. For example, the terminal device may report an ID of a cell reference signal (CRS), the ID is in a one-to-one correspondence with the beam, and a base station may learn, by using the ID, about a to-be-accessed beam selected by the terminal device.

Step 205. The second access device sends the access response message to the terminal device by using the transmit beam.

In this embodiment, the second access device sends the access response message to the terminal device through beamforming, so that the coverage area of the second access device can be enlarged, channel interference can be reduced, directivity of data sent to the terminal device can be improved, and a probability that the terminal device receives the access response message is improved. Therefore, a rate that the terminal device succeeds in accessing the second access device is improved. In particular, for a cell edge terminal device, interference from a neighboring cell is relatively great and a channel condition is inferior; as a result, a probability that the terminal device fails in accessing is quite high. According to the method in this embodiment, the beamforming manner is used in a process in which the terminal device accesses a network, so that channel interference can be reduced, a cell coverage area can be enlarged, and a rate that the terminal device succeeds in accessing the network is improved.

The method in this embodiment may be applicable to a cell handover process. In the cell handover process, the first access device is an access device serving a source cell and the second access device is an access device serving a target cell. According to the method in this embodiment, a beamforming technology is used in a process in which the terminal device accesses the target cell, so that a rate that the terminal device, a target cell edge terminal device in particular, succeeds in accessing the target cell can be improved. Therefore, efficiency of cell handover is improved.

It can be understood that the method in this embodiment may be further applicable to another scenario. For example, it is assumed that the second access device uses a high frequency band for communication and the first access device uses a low frequency band for communication. The second access device uses the high frequency band for communication; as a result, a coverage area of the second access device is small. When a terminal device in an idle state determines, through measurement, to access the second access device, but the terminal device is on an edge of a cell covered by the second access device, a probability that the terminal device directly succeeds in accessing the second access device is quite low. Therefore, the method in the foregoing embodiment may be used. To be specific, the terminal device accesses the second access device in a manner in which the first access device assists in accessing. Therefore, a rate that the terminal device succeeds in accessing the second access device can be improved.

The method in this embodiment may also be applicable to a carrier aggregation scenario. The first access device may be a primary cell, and the second access device may be a secondary cell. To be specific, after accessing the primary cell, the terminal device accesses the secondary cell through beamforming, so as to improve a rate that the terminal device succeeds in accessing.

Figure 3:
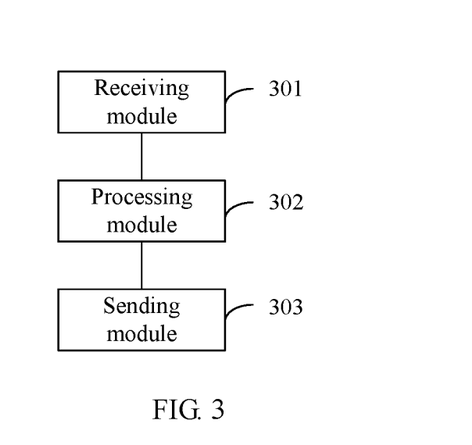
FIG. 3 is a schematic structural diagram of a second access device according to Embodiment 2 of this application.

FIG. 3 is a schematic structural diagram of a second access device according to Embodiment 2 of this application. As shown in FIG. 3, the second access device in this embodiment includes a receiving module 301, a processing module 302, and a sending module 303.

The receiving module 301 is configured to receive a preamble sequence from a terminal device on a time-frequency resource occupied by the preamble sequence. The processing module 302 is configured to determine, based on the preamble sequence received by the receiving module 301, a transmit beam that is used for sending an access response message to the terminal device. The sending module 303 is configured to send the access response message to the terminal device by using the transmit beam.

Optionally, the processing module 302 is specifically configured to: receive the preamble sequence on receive beams; determine channel quality information of each receive beam based on the preamble sequence that is received on the receive beam; select, based on channel quality information of the receive beams, a receive beam that has best channel quality as a target receive beam; determine weights of antenna ports based on the preamble sequence that is received by the antenna ports on the target receive beam; and generate the transmit beam based on the weights of the antenna ports.

Optionally, the processing module 302 may be further configured to allocate, to the terminal device, the preamble sequence that is used for accessing the second access device and the time-frequency resource occupied by the preamble sequence. Correspondingly, the sending module 303 is further configured to send access information to the terminal device by using a first access device, where the access information includes information about the preamble sequence used by the terminal device to access the second access and information about the time-frequency resource occupied by the preamble sequence.

The second access device provided in this embodiment of this application may perform the steps of the second access device in the foregoing method embodiment. An implementation principle and a technical effect of the second access device are similar to those of the steps of the second access device in the foregoing method embodiment. Details are not described herein again.

Figure 4:
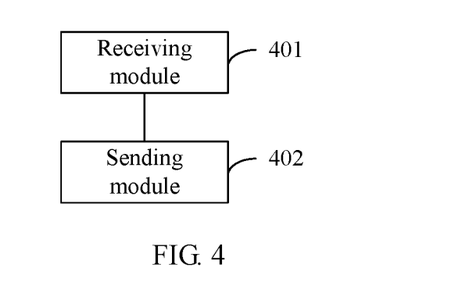
FIG. 4 is a schematic structural diagram of a terminal device according to Embodiment 3 of this application.

FIG. 4 is a schematic structural diagram of a terminal device according to Embodiment 3 of this invention. As shown in FIG. 4, the terminal device in this embodiment includes a receiving module 401 and a sending module 402.

The receiving module 401 is configured to receive access information that is from a first access device and that is used by the terminal device to access a second access device, where the access information includes information about a preamble sequence used by the terminal device to access the second access device and information about a time-frequency resource occupied by the preamble sequence. The sending module 402 is configured to send the preamble sequence to the second access device on the time-frequency resource occupied by the preamble sequence. The receiving module 401 is further configured to receive an access response message sent by the second access device.

Optionally, the preamble sequence is used to determine a transmit beam that is used for sending the access response message to the terminal device, and the second access device sends the access response message to the terminal device by using the transmit beam.

The terminal device provided in this embodiment of this invention may perform the steps of the terminal device in the foregoing method embodiment. An implementation principle and a technical effect of the terminal device are similar to those of the steps of the terminal device in the foregoing method embodiment. Details are not described herein again.

Figure 5:
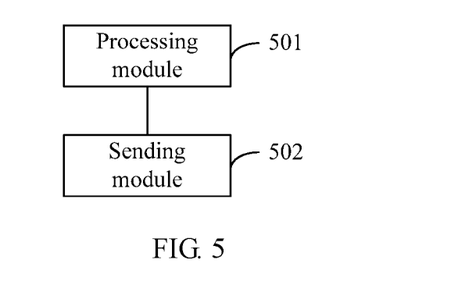
FIG. 5 is a schematic structural diagram of a first access device according to Embodiment 4 of this application.

FIG. 5 is a schematic structural diagram of a first access device according to Embodiment 4 of this application. As shown in FIG. 5, the first access device in this embodiment includes a processing module 501 and a sending module 502.

The processing module 501 is configured to obtain access information that is used by a terminal device to access a second access device, where the access information includes information about a preamble sequence used by the terminal device to access the second access device and information about a time-frequency resource occupied by the preamble sequence. The sending module 502 is configured to send the access information to the terminal device.

Optionally, the processing module 501 is further configured to determine, based on a service requirement of the terminal device, or a neighboring cell measurement result reported by the terminal device, or load information of the first access device and/or the second access device, that the terminal device is to access the second access device.

The first access device provided in this embodiment may perform the steps of the first access device in the foregoing method embodiment. An implementation principle and a technical effect of the first access device are similar to those of the steps of the first access device in the foregoing method embodiment. Details are not described again.

In Embodiment 2 to Embodiment 4, optionally, the access information is carried in an RRC connection reconfiguration message or an RRC connection setup complete message.

In Embodiment 2 to Embodiment 4, optionally, the time-frequency resource occupied by the preamble sequence is a dedicated time-frequency resource of the terminal device; or the time-frequency resource occupied by the preamble sequence is a shared time-frequency resource.

In Embodiment 2 to Embodiment 4, optionally, the second access device uses a high-frequency resource for communication, the first access device uses a low-frequency resource for communication, and the time-frequency resource occupied by the preamble sequence is a high-frequency resource. Further, the terminal device may be a cell edge terminal device in a coverage area of the second access device.

It should be noted that, in Embodiment 2 to Embodiment 4, the receiving module and the sending module may be implemented by one transceiver, or the receiving module is implemented by an independent receiver and the sending module is implemented by an independent transmitter. The processing module in the foregoing embodiments may be implemented by a processor that has a data processing function.

Figure 6:
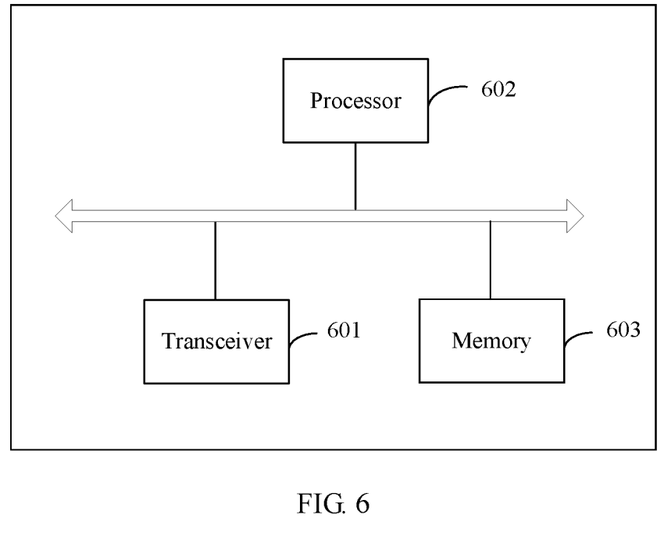
FIG. 6 is a schematic structural diagram of a second access device according to Embodiment 5 of this application.

FIG. 6 is a schematic structural diagram of a second access device according to Embodiment 5 of this application. As shown in FIG. 6, the second access device in this embodiment includes a transceiver 601, a processor 602, and a memory 603. The transceiver 601 and the memory 603 are connected to and communicate with the processor 602 by using a bus. The memory 603 is configured to store an instruction, the transceiver 601 is configured to communicate with another network device, and the processor 602 is configured to execute the instruction stored in the memory 603, so that the second access device performs the steps of the second access device in the foregoing method embodiment.

Embodiment 6 of this invention provides a terminal device. For a structure of the terminal device, refer to the second access device shown in FIG. 6. The terminal device may be configured to perform the steps of the terminal device in the foregoing method embodiment.

Embodiment 7 of this invention provides a first access device. For a structure of the first access device, refer to the second access device shown in FIG. 6. The first access device may be configured to perform the steps of the first access device in the foregoing method embodiment.

It can be understood that the processor used in the first access device, the second access device, or the terminal device in the embodiments may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination including one or more microprocessors, or a combination of a DSP and a microprocessor.

The bus described in the embodiments of this application may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings in this application is not limited to only one bus or one type of bus.

The transceiver described in various embodiments may include an independent transmitter and an independent receiver, or the transmitter and the receiver may be integrated. The transceiver may operate according to an instruction of a corresponding processor. Optionally, the transmitter may be corresponding to a transmitter in a physical device, and the receiver may be corresponding to a receiver in a physical device.

In addition, it should be understood that division of modules of the first access device, the second access device, and the terminal device is merely logical function division and may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

The following describes some terms in the foregoing embodiments for ease of understanding by a person skilled in the art.

The first access device or the second access device in the embodiments of this application is a device that connects a terminal to a wireless network, and is also referred to as a base station. The first access device or the second access device includes but is not limited to: an evolved NodeB (eNB), a radio network controller (RNC), a NodeB (NB), a base station controller (BSC), a base transceiver station (BTS), a home eNodeB (for example, Home evolved NodeB, or Home NodeB (HNB)), and a baseband unit (BBU). In addition, the first access device or the second access device may further include a Wireless-Fidelity (Wi-Fi) access point (AP), a base station in a 5G network, or the like. The 5G network is also referred to as a next generation network, a new radio access technology (New RAT or NR) network, or the like, and the base station in the 5G network is also referred to as an NR node.

The terminal device in the embodiments of this application may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges data with the radio access network. For example, the wireless terminal is a device such as a personal communication service (PCS) phone, a cordless telephone set, a Session Initiation Protocol (SIP) phone, a wireless local loop (WLL) station, or a personal digital assistant (PDA). The wireless terminal may also be referred to as a subscriber unit, a subscriber station, a mobile station, a mobile console, a remote station, a remote terminal, an access terminal, a user terminal, a user agent, or user equipment (UE). This is not limited herein.

What is claimed is:

1. A network access method, comprising:
    transmitting, by a first access device, access information regarding a terminal device accessing a second access device, the access information comprising a preamble sequence for the terminal device to access the second access device, wherein the access information is preconfigured in the first access device or the access information is obtained by the first access device from a server separate and distinct from the second access device;

receiving, by the second access device, the preamble sequence from a terminal device on a time-frequency resource occupied by the preamble sequence;

determining, by the second access device based on the received preamble sequence, a transmit beam for sending an access response message to the terminal device; and sending, by the second access device, the access response message to the terminal device using the transmit beam.

2. The method according to claim 1, wherein determining, by the second access device based on the received preamble sequence, the transmit beam for sending the access response message to the terminal device comprises:

receiving, by the second access device, the preamble sequence on receive beams;

determining, by the second access device, channel quality information of each of the receive beams based on the preamble sequence received on each of the receive beams;

selecting, by the second access device based on channel quality information of the receive beams, from the receive beams, a receive beam that has the best channel quality among the receive beams as a target receive beam;

determining, by the second access device, weights of antenna ports based on the preamble sequence received by the antenna ports on the target receive beam; and generating, by the second access device, the transmit beam based on the weights of the antenna ports.

3. The method according to claim 1, further comprising:

sending, by the second access device, access information to the terminal device using a first access device, wherein the access information comprises information about the preamble sequence used by the terminal device to access the second access device and information about the time-frequency resource occupied by the preamble sequence.

4. The method according to claim 3, wherein the access information is carried in a radio resource control (RRC) connection reconfiguration message or an RRC connection setup complete message.

5. The method according to claim 3, wherein the second access device uses a high-frequency resource for communication, the first access device uses a low-frequency resource for communication, and the time-frequency resource occupied by the preamble sequence is a high-frequency resource.

6. The method according to claim 5, wherein the terminal device is a cell edge terminal device in a coverage area of the second access device.

7. The method according to claim 1, wherein the time-frequency resource occupied by the preamble sequence is a dedicated time-frequency resource of the terminal device; or the time-frequency resource occupied by the preamble sequence is a shared time-frequency resource.

8. A second access device, comprising: a processor, and an interface circuitry; the processor and the interface circuitry are coupled with each other; wherein the processor executes program instructions to cause the second access device to perform:

receiving a preamble sequence from a terminal device on a time-frequency resource occupied by the preamble sequence, wherein preamble sequence is a constituent part of access information sent by a first access device to the terminal device regarding the terminal device accessing the second access device, wherein the access information is preconfigured in the first access device or the access information is obtained by the first access device from a server separate and distinct from the second access device;

determining, based on the received preamble sequence, a transmit beam for sending an access response message to the terminal device; and sending the access response message to the terminal device using the transmit beam.

9. The second access device according to claim 8, wherein determining, based on the received preamble sequence, the transmit beam for sending the access response message to the terminal device, comprising:

receiving the preamble sequence on receive beams;

determining channel quality information of each of the receive beams based on the preamble sequence received on each of the receive beams;

selecting, based on channel quality information of the receive beams, from the receive beams, a receive beam that has the best channel quality among the receive beams as a target receive beam;

determining weights of antenna ports based on the preamble sequence received by the antenna ports on the target receive beam; and generating the transmit beam based on the weights of the antenna ports.

10. The second access device according to claim 8, wherein:

sending access information to the terminal device using a first access device, wherein the access information comprises information about the preamble sequence used by the terminal device to access the second access device and information about the time-frequency resource occupied by the preamble sequence.

11. A terminal device, comprising: a processor, and an interface circuitry; the processor and the interface circuitry are coupled with each other; wherein the processor executes program instructions to cause the terminal device to perform:

receiving access information from a first access device, the access information being used by the terminal device to access a second access device, wherein the access information comprises a preamble sequence for the terminal device to access the second access device and information about a time-frequency resource occupied by the preamble sequence, wherein the access information is preconfigured in the first access device or the access information is obtained by the first access device from a server separate and distinct from the second access device;

sending the preamble sequence to the second access device on the time-frequency resource occupied by the preamble sequence; and receiving an access response message sent by the second access device.

12. The terminal device according to claim 11, wherein the preamble sequence is used to determine a transmit beam for sending the access response message to the terminal device, and wherein the second access device sends the access response message to the terminal device using the transmit beam.

13. The terminal device according to claim 11, wherein the access information is carried in a radio resource control (RRC) connection reconfiguration message or an RRC connection setup complete message.

14. The terminal device according to claim 11, wherein the time-frequency resource occupied by the preamble sequence is a dedicated time-frequency resource of the terminal device; or the time-frequency resource occupied by the preamble sequence is a shared time-frequency resource.

15. The terminal device according to claim 11, wherein the second access device uses a high-frequency resource for communication, the first access device uses a low-frequency resource for communication, and the time-frequency resource occupied by the preamble sequence is a high-frequency resource.

16. The terminal device according to claim 15, wherein the terminal device is a cell edge terminal device in a coverage area of the second access device.

* * * * *